United States Patent [19]

Marchwiak et al.

[11] Patent Number: 5,431,428
[45] Date of Patent: Jul. 11, 1995

[54] CARRYING CASE ASSEMBLY WITH BUILT-IN CART

[75] Inventors: Zbigniew Marchwiak; Silvano Brugioni, both of Chicago, Ill.

[73] Assignee: Travel Caddy, Inc., Chicago, Ill.

[21] Appl. No.: 150,381

[22] Filed: Nov. 9, 1993

[51] Int. Cl.⁶ .............................................. B62B 1/12
[52] U.S. Cl. .............................. 280/655; 280/47.315; 280/37; 280/655.1; 190/18 A
[58] Field of Search .................. 280/37, 47.26, 47.315, 280/47.371, 655, 655.1; 190/18 A, 39, 115

[56] References Cited

U.S. PATENT DOCUMENTS

| | | |
|---|---|---|
| 3,612,563 | 10/1971 | Kazmark, Sr. |
| 3,998,476 | 12/1976 | Kazmark, Sr. ........................ 280/655 |
| 4,175,769 | 11/1979 | Kazmark ............................. 280/654 |
| 4,221,402 | 9/1980 | Kazmark ............................. 280/659 |
| 4,254,850 | 3/1981 | Knowles ........................... 190/18 A |
| 4,401,319 | 8/1983 | Kazmark ............................. 280/655 |
| 4,588,055 | 5/1986 | Chen ................................ 190/18 A |
| 4,630,837 | 12/1986 | Kazmark ............................. 280/47.2 |
| 4,754,985 | 7/1988 | Im et al. ............................ 280/655 |
| 4,896,897 | 1/1990 | Wilhelm ............................. 280/655 |
| 4,974,871 | 12/1990 | Mao ................................ 280/47.371 |
| 4,995,487 | 2/1991 | Plath .............................. 190/18 A |
| 5,108,119 | 4/1992 | Huang ............................. 280/47.26 |
| 5,124,458 | 6/1992 | Kazmark et al. .................... 280/645 |
| 5,167,306 | 12/1992 | Carrigan, Jr. ...................... 190/115 |
| 5,178,404 | 1/1993 | Chen ................................ 280/655 |
| 5,295,565 | 3/1994 | Latshaw .......................... 190/18 A |
| 5,335,759 | 8/1994 | Yeh .................................. 190/39 |

OTHER PUBLICATIONS

"Clipper/Remin Product Comparison Chart," 1 page, one-sided Information Sheet (no date shown on sheet).
"The Clipper Story," 1 page, one-sided Brochure (no date shown on brochure).
"Don't Carry Those Bags!!!," 1 page, one-sided Brochure, Clipper Products, Cincinnati, Ohio (no date shown on brochure).

Primary Examiner—Margaret A. Focarino
Assistant Examiner—Carla Mattix
Attorney, Agent, or Firm—Fitch, Even, Tabin & Flannery

[57] ABSTRACT

A carrying case assembly is provided with a case defining an enclosed interior, and a collapsible handle assembly disposed within the case. The handle assembly includes a push button which allows the handle to collapse within the case. Wheels are provided on the outside of the case so that, in conjunction with the extended handle, the case may be transported as if it were a wheeled cart.

15 Claims, 7 Drawing Sheets

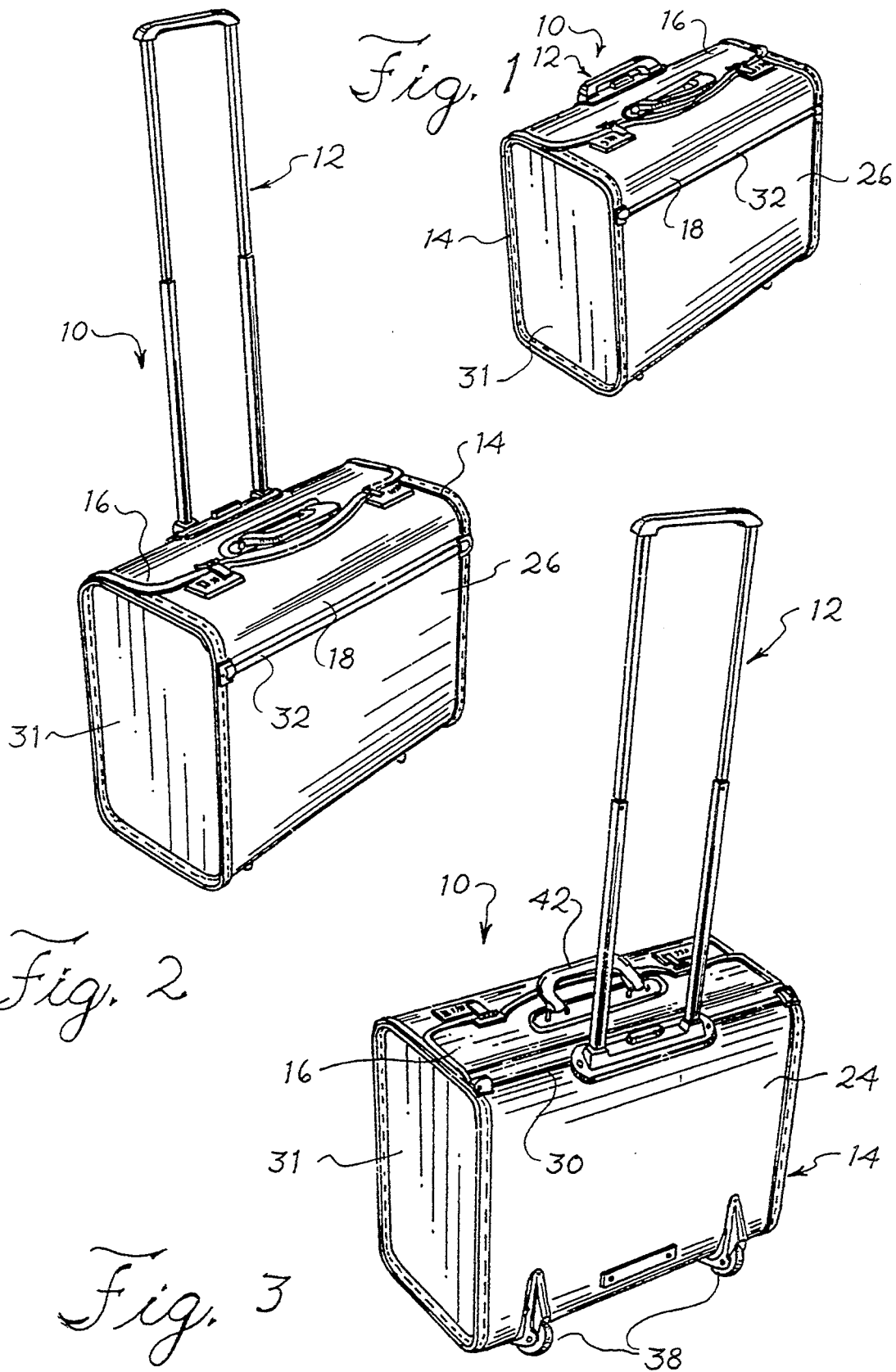

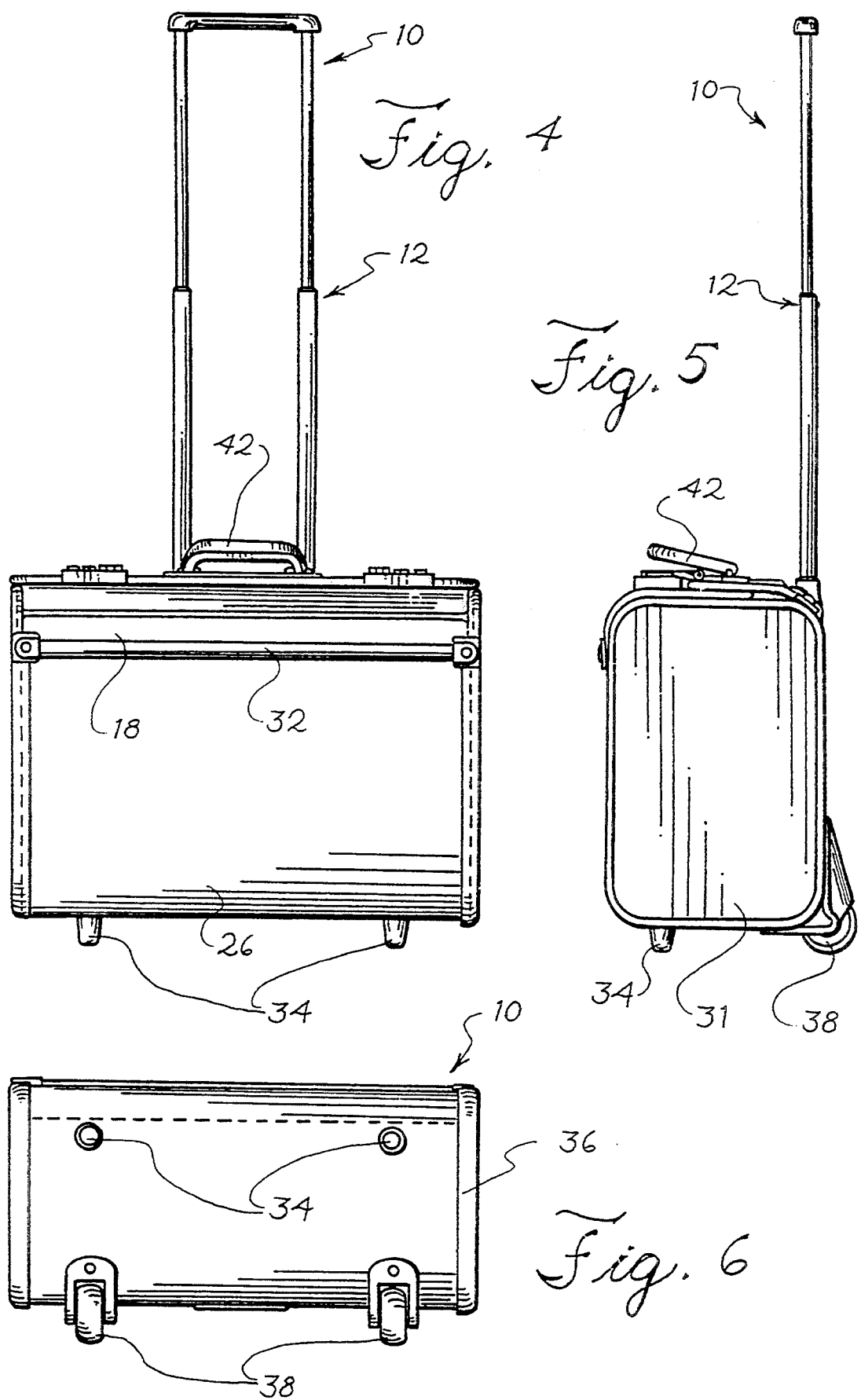

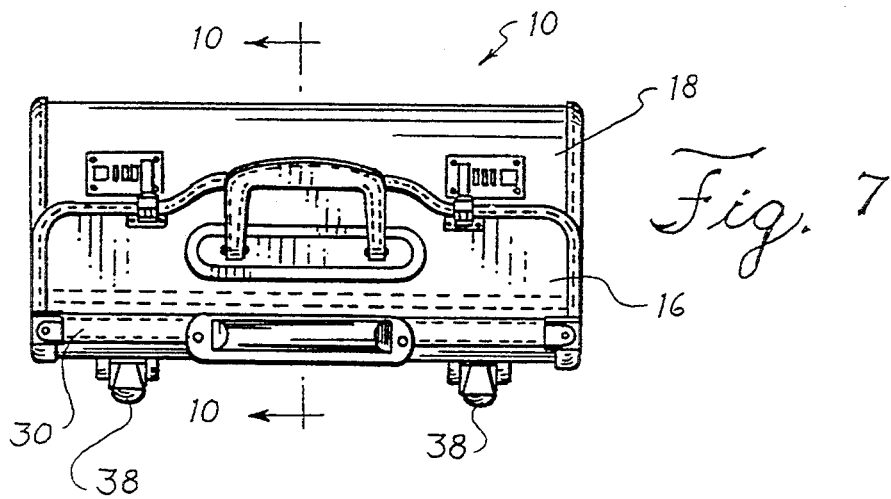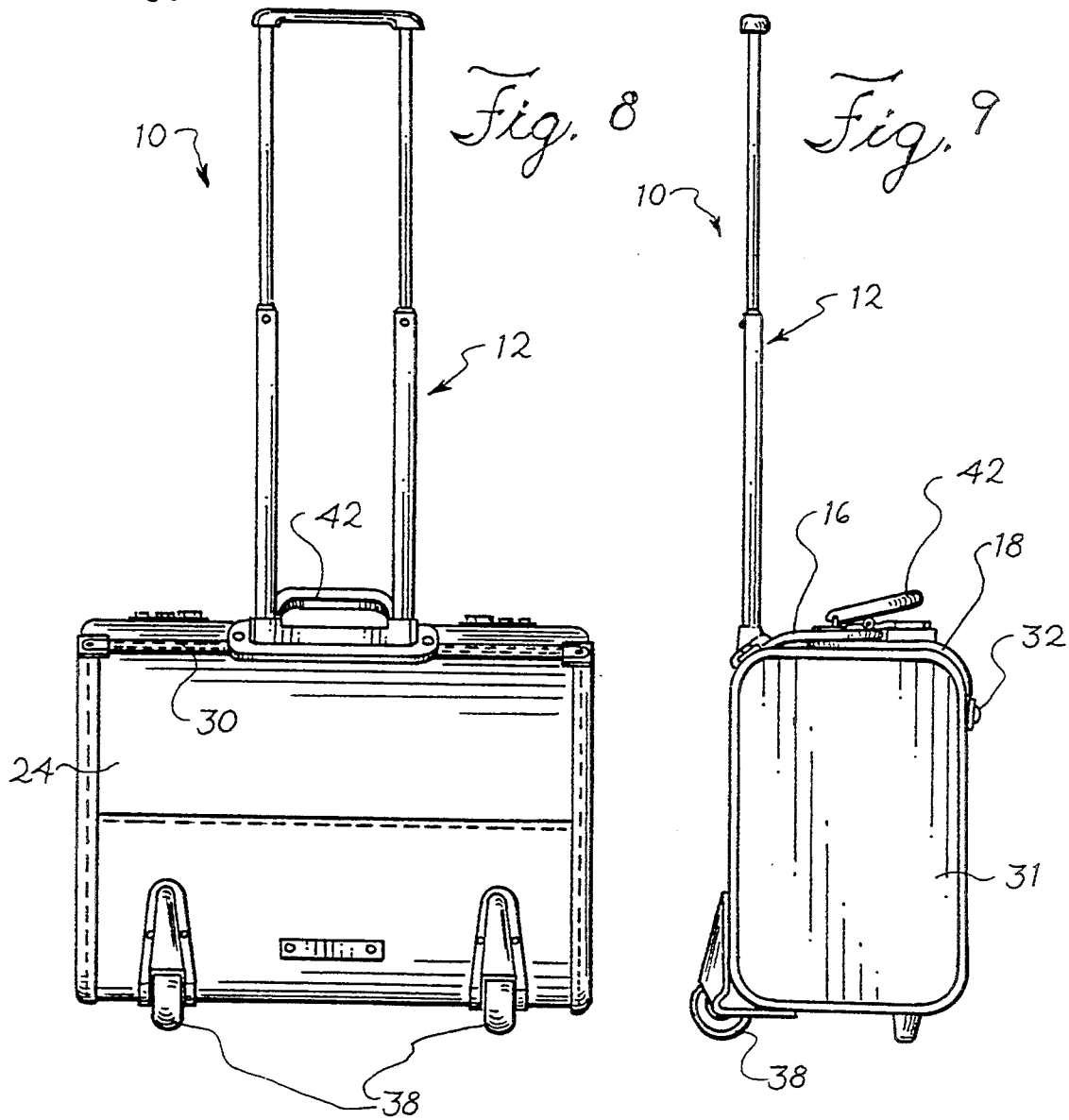

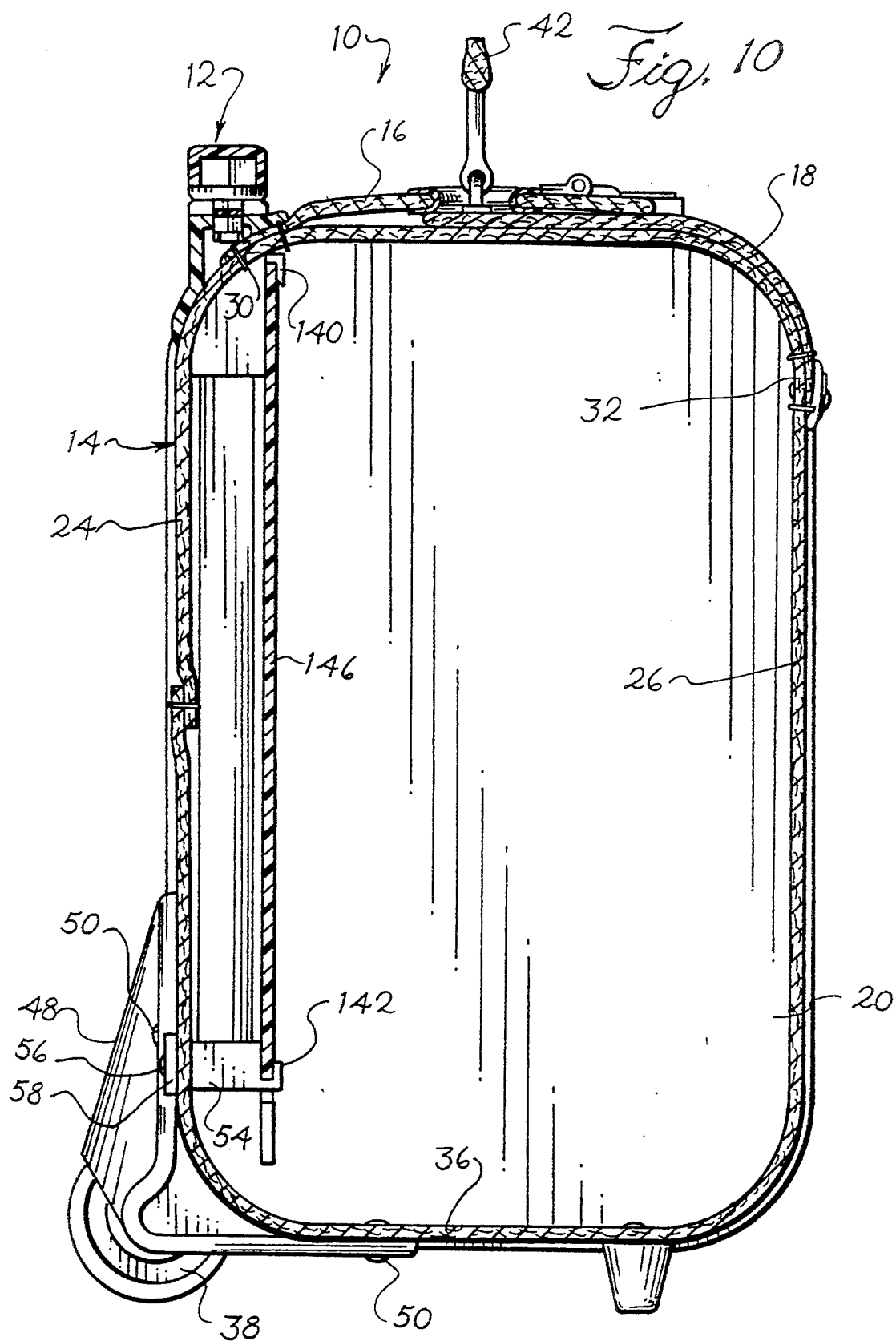

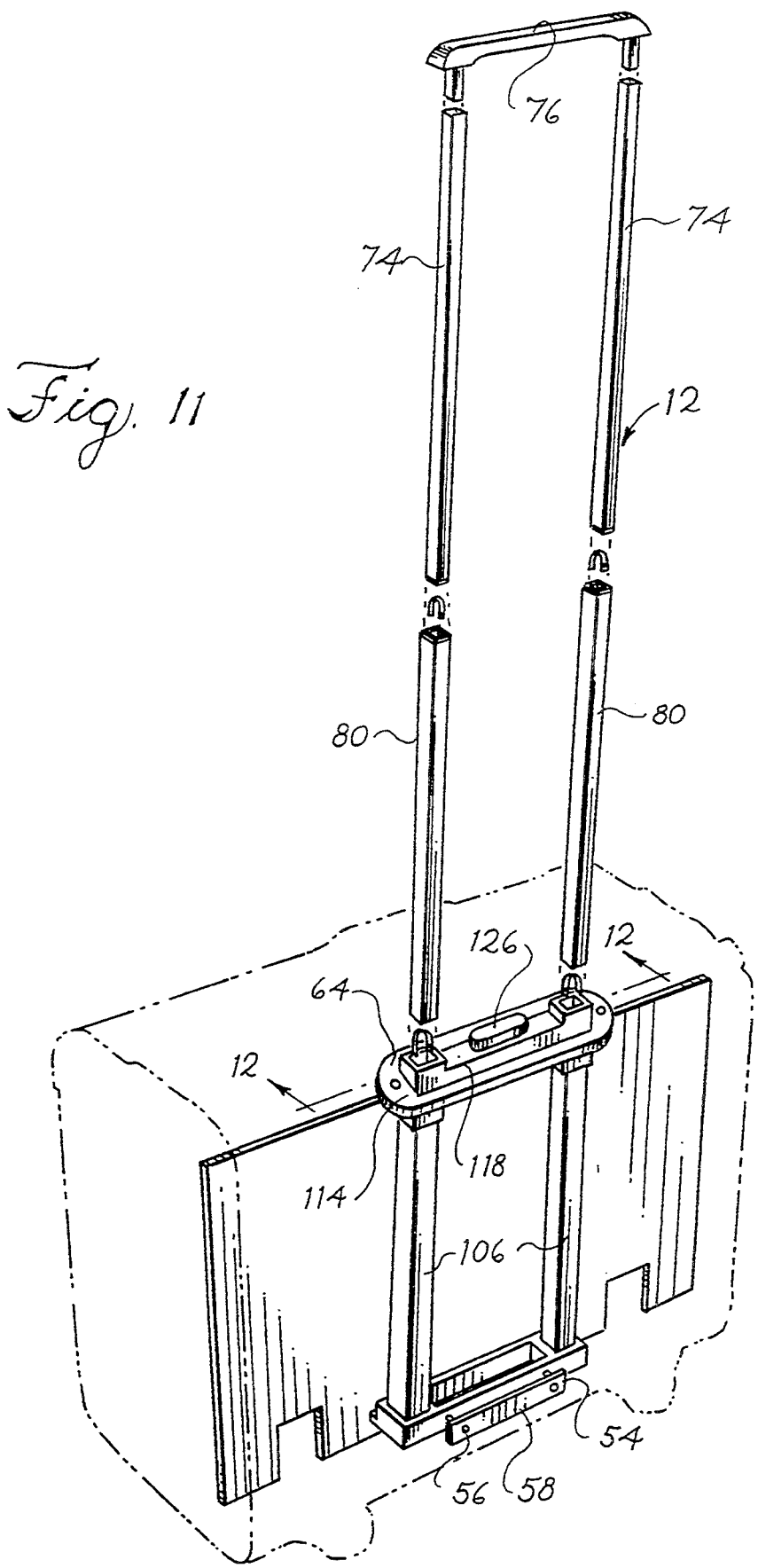

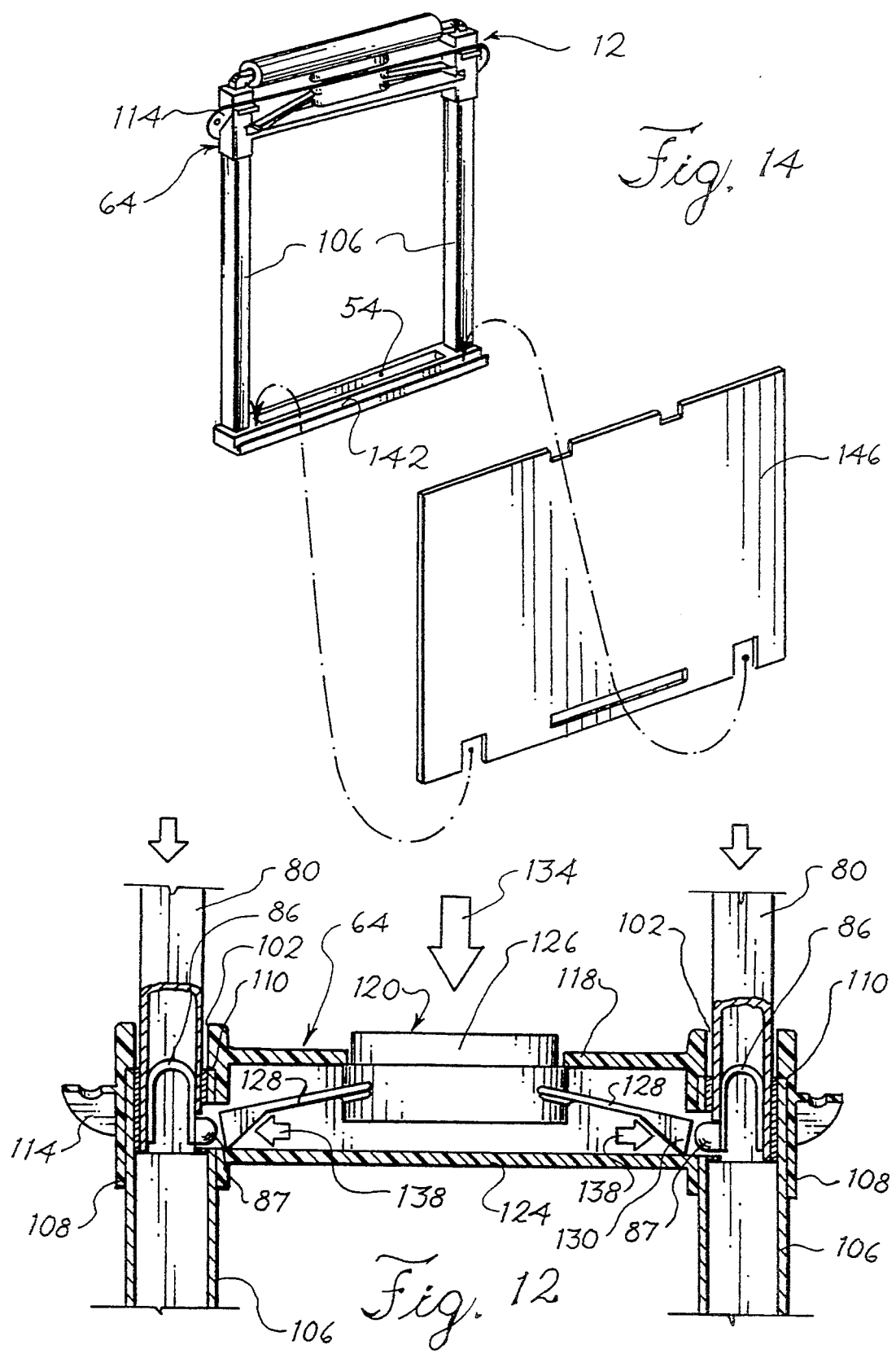

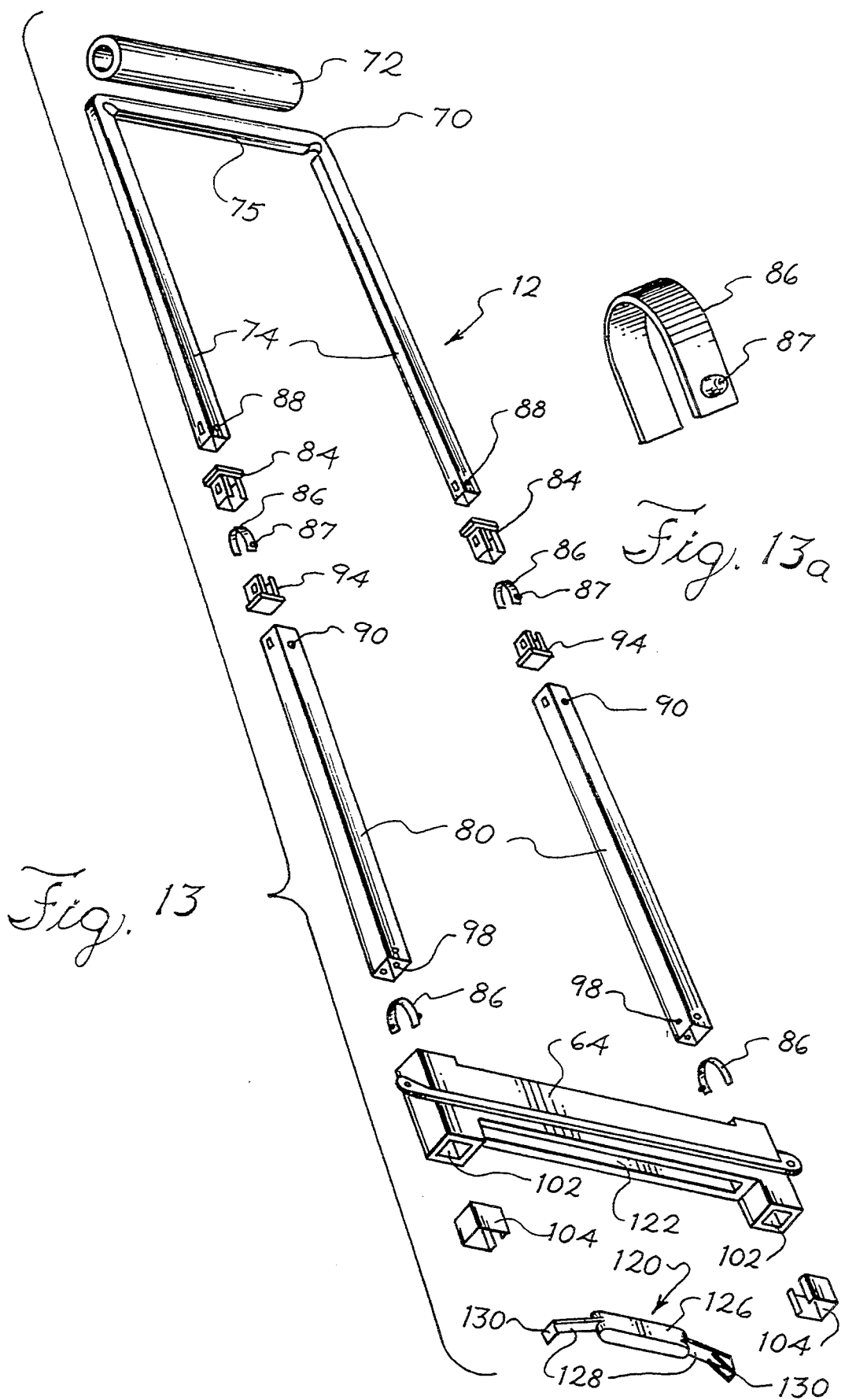

CARRYING CASE ASSEMBLY WITH BUILT-IN CART

BACKGROUND OF THE INVENTION

1. Field of the Invention,

The present invention pertains to cases having hinged lids, and in particular to such cases having wheel assemblies incorporated therewith.

2. Description of the Related Arts

Two-wheel carts have been proposed for use with luggage and other personal items which must be carried about from place to place, usually over considerable distances. It is desirable that such carriers be relatively lightweight, and collapsible to a relatively small package when not in use. For example, U.S. Pat. No. 4,401,319 discloses a luggage carrier having a pivoting handle, made of lightweight tubular construction. The handle has two pivotally connected portions which interlock. Other carts, such as those disclosed in U.S. Pat. Nos. 3,612,563; 4,175,769; 4,221,402; 4,630,837; and 5,024,458, have telescopic interfitting handles which can be compressed to a size substantially smaller than one-half the height of the extended handle. The ease of interlocking telescoping handle portions has been addressed in U.S. Pat. Nos. 3,998,476 and 4,896,897, which employ spring-loaded locking buttons carried on one telescoping handle part which snap into an adjacent handle part to lock the handles in an extended position. The handles are typically provided with an inverted U-shape, with spring-loaded buttons installed in each leg of the "U."

Each of the luggage carriers described above comprise separate stand-alone mechanisms upon which luggage or other articles may be placed. Thus, one carrier can be used for a variety of different applications. However, it is sometimes desired to provide a case having an integrated cart.

SUMMARY OF THE INVENTION

It is an object of the present invention to provide a carrier mechanism which can be built into a carrying case.

Another object according to principles of the present invention is to provide a combined carrying case and carrier product, which is attractive in appearance, while being economical to manufacture.

Yet another object according to principles of the present invention is to provide a combined carrier and luggage case in which the carrier components can be hidden within the case so as to be virtually undetectable.

These and other objects according to principles of the present invention are provided in a carrying case, comprising:

a case;

a housing attached to the case;

a handle telescopically interfitting within the housing;

a housing lock means for holding the handle in an extended position with respect to the housing, the housing lock means including a selectably releasable housing-locking protrusion on said handle, movable in opposing directions toward and away from the housing, into and out of engagement therewith;

a spring bias means for biasing the protrusion toward the housing for engagement therewith;

a linkage within said housing, movable toward the housing lock means to move the housing lock means out of engagement with the housing, and movable away from the housing lock means to allow the bias means to urge the housing lock means into engagement with said housing.

BRIEF DESCRIPTION OF THE DRAWINGS

FIG. 1 is a perspective view of a carrying case assembly illustrating principles of the present invention.

FIG. 2 is a perspective view thereof with the handle extended.

FIG. 3 is a perspective view from the rear thereof.

FIG. 4 is a front elevational view thereof.

FIG. 5 is a side elevational view thereof.

FIG. 6 is a bottom plan view thereof.

FIG. 7.is a top plan view thereof.

FIG. 8 is a rear elevational view thereof.

FIG. 9 is a side elevational view from the opposite view thereof.

FIG. 10 is a cross-sectional view taken along the line 10—10 of FIG. 7.

FIG. 11 is a fragmentary perspective view showing internal components thereof.

FIG. 12 is a fragmentary cross-sectional view taken along the line 12—12 of FIG. 11.

FIG. 13 is an exploded perspective view showing assembly of the handle thereof.

FIG. 13A is an enlarged perspective view of a clip used in the handle assembly shown in FIG. 13.

FIG. 14 is a fragmentary perspective view showing further development of the handle assembly.

DETAILED DESCRIPTION OF THE PREFERRED EMBODIMENT

Referring now to the drawings, and initially to FIGS. 1-9, a carrying case assembly, according to principles of the invention, is generally indicated at 10. As can be seen by comparing FIGS. 1 and 2, assembly 10 has a built-in telescoping handle assembly generally indicated at 12. In the preferred embodiment, a receptacle is provided for carrying items from place to place. The preferred form of the receptacle is that of a case 14, having features resembling a conventional catalog sample case, or "map case." In the preferred embodiments case 14 is specially fabricated for use in assembly 10. However, conventional cases can be readily adapted for use with the present invention, as will be seen from the following description. The preferred form of case assembly 10 has a tubular body with generally rectangular sides, corners which are rounded, and a pair of hinged cover flaps 16, 18 which open to permit access to the case interior 20 (see FIG. 10). A handle 42 is secured to cover flap 18 by suitable means, such as rivets.

Referring to FIG. 10, the cover flaps 16, 18 are joined to case walls 24, 26 by hinges 30, 32, respectively. As can be seen in the FIGURES, case 14 is generally symmetrical, except for the placement of hinges 30, 32. As will be seen herein, the hinged sidewall 24 is extended so as to raise hinge 30 so as to accommodate handle assembly 12 in the preferred embodiment. This feature of the case construction allows the handle assembly 12 to be virtually undetectable, with minimal loss of interior volume within case 14. If desired, however, the handle assembly could be attached outside of case 14 with hinges 30, 32 at a common height.

Case 14 further includes end walls 31 and a bottom wall 36 carrying a pair of standoffs 34. A pair of wheels 38 are mounted to rear wall 24 and bottom wall 36. As can be seen in FIGS. 5 and 9, for example, the handle assembly 12 is located adjacent the rear wall of case 14. The front and rear walls 26, 24 bottom wall 36 and cover flaps 16, 18 are joined together so as to form a hollow tube and form the distinctive outer surface of case 14. Accordingly, it is generally preferred that members 16, 18, 24, 26 and 36 have generally the same visual appearance and preferably are made of the same material. A variety of conventional materials may be used, including plastics, paper products and fabric materials, and laminates and composites thereof. Depending upon the choice of materials employed, hinges 30, 32 may comprise lines of local flexing (especially where the case is made of leather or simulated leather materials). However, it is generally preferred that the walls 24, 26, 36 and cover flaps 16, 18 are made of generally rigid plastic materials, and it is preferred that hinges 30, 32 have a discrete construction, separately formed, and attached to walls 24, 26 and the cover flaps 16, 18. For example, hinges 30, 32 could be of a "piano-type" construction made of metal or plastic materials.

As shown in FIG. 10, wheels 38 have L-shaped mounting brackets 48 mounted to walls 24, 36 by rivets 50, or other suitable fasteners. In addition to L-brackets 48, portions of handle assembly 12 are also secured to the walls of case 14. Referring to FIG. 11, handle assembly 12 has a lower mounting plate 54 secured to rear wall 24 by rivet fasteners 56 extending through a backup plate 58. Handle assembly 12 further includes an upper mounting plate 64 secured to the upper end of rear wall 24 by rivet or other fasteners.

Referring now to FIGS. 10-14, handle assembly 12 includes an upper handle portion 70, as shown in FIG. 13, having an inverted U-shape, made of hollow tubular material, preferably metal. A foam grip 72 is placed around the bight portion of the upper handle member. An alternative construction is shown in FIG. 11 where a pair of upper slide members 74, preferably of hollow tubular construction, are joined together by a molded plastic handle portion 76 to forman upper handle part of inverted U-shape. Handle 12 further includes lower tubular slide members 80 having a hollow bore dimensioned to receive slide members 74. In the embodiment shown in FIG. 13, the upper handle portion 70 includes hollow tubular leg members 74 integrally formed with a bight portion 75. Top portions 84, preferably of molded plastic or metal material, are temporarily slid over slide members 74. Snap buttons 86 are inserted into the free ends of slide members 74 to function as handle lock means. The snap buttons preferably include a flat metal spring member and a protrusion or latch in the form of a rounded button 87 which is inserted through apertures 88 in the slide members. The rounded buttons 87 protrude through slide members 74 so as to be received in apertures 90 formed in the free ends of slide members 80. End caps 94 are then inserted in the free ends of slide member 74 and are secured with suitable fasteners such as screws or rivets. Alternatively, resilient tangs can be struck out of the end caps 94 so as to engage barbs or openings for other conventional securement features formed in the free ends of slide member 74. The top bushings 84 are then secured to the upper ends of slide members 80 by conventional means.

A second pair of snap buttons 86 or housing lock means are then inserted in the lower free ends of slide members 80 so that their rounded buttons oppose one another, passing through apertures 98 formed in the lower end of tubular slide members 80. The slide members 80 are then inserted through tubular passageways 102 formed in the upper mounting bracket 64. Bottom bushings 104 are then secured to the lower ends of tubular members 80 with suitable fasteners. Together, the members 74, 80 function as first and second telescoping handle portions.

Referring again to FIG. 11, the bottom mounting plate 54 defines a pair of sockets for receiving support tubes 106. The upper mounting plate 64 also includes sockets formed by shoulder members 108 for receiving the upper ends of support tubes 106. In the preferred embodiment, as illustrated in FIG. 12, the support tubes 106 extend throughout most of the tubular passageways 102. The passageways 102 are enlarged so as to form step portions 110 for engaging the upper free ends of support tubes 106. As shown in FIG. 12, the upper ends of support tubes 106 have apertures for receiving the rounded buttons 87.

With continuing reference to FIGS. 11 and 12, the upper mounting plate 64 includes an outwardly extending flange 114 overlying the upper, rounded end of rear wall 24. Upper mounting plate 64 further includes a middle, hollow, housing portion 118 defining a hollow interior cavity for receiving a linkage assembly 120. In the preferred embodiment, the housing portion 118 has a downwardly extending opening 122 (see FIG. 13) through which the linkage assembly 120 is inserted, with the hollow interior cavity of housing 118 being enclosed by a bottom plate.

Linkage assembly 120 is preferably made of unitary molded plastic construction to include a body or push button 126 and a pair of opposed resilient arms 128 which bias push button 126 in an upward direction. Arms 128 preferably have enlarged end portions 130. When push button 126 is pushed in the downward direction of arrow 134 in FIG. 12. The enlarged free ends 130 of arms 128 cam across the bottom plate 124 so as to displace enlarged free ends 130 against buttons 87, in the outward directions indicated by arrows 138. With the buttons 87 at the lower ends of slide members 80 being depressed, the slide members 80 are released to slide within the tubular passageways 102. The rounded free ends of the buttons facilitate this release, since the enlarged ends 130 preferably are not dimensioned so as to enter the apertures 98 which receive the buttons 87. Accordingly, the rounded free ends of buttons 87 are relied upon to cam across the thickness of the tubular passageways 102 which form the button-receiving aperture 98. If desired, the enlarged free ends 130 could be provided with protrusions dimensioned to be received within apertures 98, so as to force the buttons to clear the tubular passageways 102. It is possible in this instance to provide buttons with a blunt end. In either event, by depressing the button 126, both buttons 87 at the bottom ends of slide members 80 are substantially simultaneously released, allowing the slide members 80 to be stored within the case.

Referring now to FIGS. 10, 11 and 14, the upper mounting plate 64 includes mounting clips 140 facing toward the interior volume of case 14. The bottom mounting plate 54 includes an upwardly opening channel 142, also facing toward the interior of case 14. An internal divider wall 146 is mounted between members 140, 142 and shields the case interior 20 from the moving parts of handle assembly 12. Also, internal wall 146 prevents objects from inadvertently entering the handle assembly, which might interfere with operation of the moving components thereof.

In operation, the handle assembly 12 may be stored in a collapsed condition, such as that illustrated in FIG. 1. When a user desires to initiate operation of assembly 10 as a cart, the upper portion of the handle assembly is grasped so as to extend slide members 74 from slide members 80, bringing the snap buttons attached to slide members 74 into engagement with apertures 90 and slide members 80, locking the slide members 74, 80 in an extended position.

With continued pulling on the upper portion of the handle assembly, slide members 80 are withdrawn from upper mounting plate 64, bringing the snap buttons attached to the bottom ends of slide members 80 into engagement with apertures formed at the upper ends of support tubes 106, locking the slide members 80 in an extended position, and thus bringing the handle assembly 12 into the fully extended position (illustrated in FIGS. 2 and 3, for example). The case assembly may then be rolled about on wheels 38.

When retraction of the handle assembly is desired, a user, with finger pressure on the snap buttons protruding through apertures 90, depresses the snap buttons, allowing slide members 74 to move within slide members 80. If desired, the snap buttons 86 attached to the lower ends of slide members 74 can be configured so that, with a predetermined compressive force applied to the upper end of the handle assembly, the snap buttons will come out of engagement with apertures 90 without requiring a user to depress the snap buttons. This automatic releasing feature has not been found necessary for operation of the upper mounting plate 64. Rather, it is preferred that the slide members 80 be positively locked with respect to the support tubes 106, and that the locking engagement therebetween not be released with compressive pressure applied to the handle assembly. Further, it is preferred that the release of the locking of slide members 80 be accomplished by depressing button 126 in a downward direction of arrow 134 (see FIG. 12). By depressing button 126, arms 128 travel in the outward direction of arrows 138, pressing against the rounded buttons 87, allowing the rounded buttons to clear support tubes 106, allowing downward movement of slide members 80 to the retracted configuration shown in the FIGURES.

It can thus be seen that the handle assembly is substantially enclosed, protected from contamination or an interference with adjacent objects, by interior wall 146 disposed within the interior of case 14, and by enclosing linkage assembly 120 within the hollow housing of upper bracket 64. As shown in FIG. 10, the interior wall 146 is raised a slight amount above bottom wall 36 so as to form a gap. If desired, this gap can be closed off by downwardly extending internal wall 146, although this has not been found to be necessary.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A carrying-case, comprising:
   a case;
   a housing attached to the case;
   a handle telescopically interfitting within the housing;
   a housing lock means for holding the handle in an extended position with respect to the housing, the housing lock means including selectably releasable housing-locking protrusions on said handle, movable in opposing directions toward and away from the housing, into and out of engagement therewith;
   a housing-locking spring bias means for biasing the housing-locking protrusions toward the housing for engagement therewith;
   linkage within said housing, movable toward the housing lock means to move the housing-locking protrusion out of engagement with the housing, and movable away from the housing-locking protrusion to allow the housing-locking spring bias means to urge the housing-locking protrusion into engagement with said housing; and
   said linkage including a button with a pair of opposed arms attached to the button so as to be movable in opposite directions toward and away from the handle, with the arms movable out of and into engagement with the housing-locking protrusions in response to the button being moved in said respective opposite directions.

2. The carrying case according to claim 1 wherein said handle has first and second portions telescopically interfitting one within the other and both telescopically interfitting within the housing, the carrying case further Comprising:
   a handle lock means for holding the first handle portion in an extended position relative to the second handle portion, the handle lock means including a selectably releasable handle-locking protrusion on one of said first and said second handle portions, movable in opposing directions toward and away from the other of said first and said second handle portions, into and out of engagement therewith; and
   a handle spring bias means for biasing the handle lock means toward the other of said first and said second handle portions for engagement therewith.

3. The carrying case according to claim 2 further comprising wheels attached to the case, for rolling the case along a support surface.

4. The carrying case according to claims 2 wherein:
   the housing defines a pair of passageways, one for each leg of the first and second handle portions; and
   the housing lock means comprises a pair of housing-locking protrusions, one associated with each housing passageway.

5. The carrying case according to claim 4 wherein the first and second portions of the handle each include a pair of spaced apart, generally parallel legs, with the handle lock means comprising a pair of handle lock members, one on each of the legs of the second handle portion, and wherein the pair of housing-locking protrusions extend toward one another in spaced, generally opposed relationship.

6. The carrying case according to claim 5 wherein the button is mounted in the housing for reciprocation in opposite directions generally parallel to the legs, and wherein reciprocating movement of the button in respective opposite directions results in movement of the arms toward and away from the pair of housing-locking protrusions.

7. The carrying case according to claim 6 wherein the linkage is substantially enclosed by the housing.

8. The carrying case according to claim 2 wherein 6he handle-locking protrusion comprises a rounded button and the handle spring bias means comprises a band spring having a free end to which the rounded button is mounted.

9. The carrying case according to claim 8 wherein the housing-locking protrusion comprises a rounded button and the spring bias means biasing the housing-locking protrusions comprises a band spring having a free end to which the rounded button is mounted.

10. A linkage assembly for a wheeled carrying case having a handle with a pair of legs passing through the assembly and with a central portion between the legs, comprising:

a housing defining a pair of passageways, one for each leg of the handle portions;

means for attaching the housing to the case;

a lock means for holding the handle in an extended position with respect to the housing, the lock means including a selectably releasable housing-locking protrusion on each leg of one of said handle portions, movable in opposing directions toward and away from the housing, into and out of engagement therewith, with the housing-locking protrusions extending toward one another in spaced, generally opposed relationship;

a housing-locking spring bias means for biasing the housing-locking protrusions toward the housing for engagement therewith;

linkage mounted in the housing for reciprocation in directions generally parallel to the legs and so as to be substantially enclosed by the housing, the linkage including a button with a pair of opposed arms attached to the button so as to be movable into and out of engagement with the housing-locking protrusions; and wherein reciprocating movement of the button in respective opposite directions, away from and toward the central portion of the handle results in movement of the arms into and out of engagement with the housing-locking protrusions.

11. The linkage assembly of claim 10 wherein the housing-locking protrusions extend toward one another in spaced apart, generally opposed relationship.

12. A carrying case, comprising:

a case;

a housing attached to the case;

a handle having first and second portions telescopically interfitting one within the other and both telescopically interfitting within the housing, the first and second portions of the handle each including a pair of spaced apart, generally parallel legs;

a handle lock means for holding the first handle portion in an extended position relative to the second handle portion, the handle lock means including a selectably releasable handle-locking protrusion on one of said first and said second handle portions, movable in opposing directions toward and away from the other of said first and said second handle portions, into and out of engagement therewith;

a handle-lock spring bias means for biasing the handle lock means toward the other of said first and said second handle portions for engagement therewith;

a housing lock means for holding the first and second handle portions in an extended position with respect to the housing, the housing lock means including a selectably releasable housing-locking protrusion on one of said handle portions, movable in opposing directions toward and away from the housing, into and out of engagement therewith;

a housing-lock spring bias means for biasing the housing lock means toward the housing for engagement therewith;

linkage within said housing, including a button mounted in the housing for reciprocation in respective opposite directions generally parallel to the legs, the linkage further including a pair of opposed arms engagable with the housing-locking protrusions, the arms attached to the button so that reciprocating movement of the button in a first of two opposite directions results in movement of the arms toward the housing-locking protrusions to move the housing-locking protrusions out of engagement with the housing and so that reciprocating movement of the button in a second of the two opposite directions results in movement of the arms away from the housing-locking protrusions to allow the housing-lock bias means to urge the housing-locking protrusions into engagement with said housing; and wheels attached to the case, for rolling the case along a support surface.

13. A carrying case, comprising:

a case;

a housing attached to the case and defining a pair of housing passageways;

a handle having first and second portions telescopically interfitting one within the other and both telescopically interfitting within respective passageways defined by the housing, with the first and second portions of the handle each including a pair of spaced apart, generally parallel legs;

a housing lock means for holding the handle in an extended position with respect to the housing, the housing lock means including a pair of housing-locking protrusions, one associated with each housing passageway, with the housing-locking protrusions extending toward one another in spaced, generally opposed relationship, with the housing lock means further including selectably releasable housing-locking protrusions on said handle, movable in opposing directions toward and away from the housing, into and out of engagement with the housing;

a housing-locking spring bias means for biasing the housing-locking protrusions toward the housing for engagement therewith;

linkage within said housing, movable toward the housing-locking protrusion to move the housing-locking protrusion out of engagement with the housing, and movable away from the housing-locking protrusions to allow the bias means to urge the housing-locking protrusions into engagement with said housing, said linkage further including a button with a pair of opposed arms attached to the button so as to be movable toward and away from the handle, with the arms movable out of and into engagement with the housing-locking protrusions;

a handle lock means for holding the first handle portion in an extended position relative to the second handle portion, the handle lock means including a pair of selectably releasable handle-locking protrusions on said second handle portions, movable in opposing directions toward and away from said first handle portions, into and out of engagement therewith; and a handle spring bias means for biasing the handle-locking protrusions toward the other of said first and said second handle portions for engagement therewith.

14. The carrying case according to claim 13 wherein the button is mounted in the housing for reciprocation in directions generally parallel to the legs, and wherein reciprocating movement of the button in respective opposite directions results in movement of the arms toward and away from the housing-locking protrusions.

15. The carrying case according to claim 13 wherein the linkage is substantially enclosed by the housing.

* * * * *